(12) United States Patent
Fukugawa et al.

(10) Patent No.: US 8,339,473 B2
(45) Date of Patent: Dec. 25, 2012

(54) VIDEO CAMERA WITH FLICKER PREVENTION

(75) Inventors: Kohei Fukugawa, Osaka (JP); Kazuhiro Tsujino, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 449 days.

(21) Appl. No.: 12/501,586

(22) Filed: Jul. 13, 2009

(65) Prior Publication Data

US 2010/0013954 A1 Jan. 21, 2010

(30) Foreign Application Priority Data

Jul. 15, 2008 (JP) ................................. 2008-183526

(51) Int. Cl.
*H04N 9/73* (2006.01)
*H04N 5/228* (2006.01)
(52) U.S. Cl. ................. 348/226.1; 348/222.1; 348/223.1
(58) Field of Classification Search .................. None
See application file for complete search history.

(56) References Cited

U.S. PATENT DOCUMENTS

| | | | | |
|---|---|---|---|---|
| 5,877,810 A | * | 3/1999 | Inuiya et al. | 348/362 |
| 6,683,652 B1 | * | 1/2004 | Ohkawara et al. | 348/347 |
| 7,656,436 B2 | * | 2/2010 | Kinoshita et al. | 348/226.1 |
| 7,965,323 B2 | * | 6/2011 | Lee et al. | 348/226.1 |
| 2006/0181634 A1 | * | 8/2006 | Onozawa | 348/345 |
| 2006/0221205 A1 | * | 10/2006 | Nakajima et al. | 348/226.1 |
| 2007/0052835 A1 | * | 3/2007 | Onozawa | 348/345 |
| 2007/0153094 A1 | * | 7/2007 | Noyes et al. | 348/226.1 |
| 2007/0182831 A1 | * | 8/2007 | Katoh et al. | 348/226.1 |
| 2008/0284870 A1 | * | 11/2008 | Yokoi | 348/228.1 |
| 2008/0303925 A1 | * | 12/2008 | Oota | 348/234 |
| 2010/0226640 A1 | * | 9/2010 | Hirose | 396/260 |

FOREIGN PATENT DOCUMENTS

| | | |
|---|---|---|
| JP | 07-115578 A | 5/1995 |
| JP | 09-284634 A | 10/1997 |
| JP | 2001-186407 A | 7/2001 |
| JP | 2005-229353 A | 8/2005 |
| JP | 2005-311972 A | 11/2005 |

OTHER PUBLICATIONS

Japanese Office Action dated Jun. 19, 2012, issued in corresponding Japanese Patent Application No. 2008-183526, with English translation (4 pages).

* cited by examiner

*Primary Examiner* — Lin Ye
*Assistant Examiner* — John H Morehead, III
(74) *Attorney, Agent, or Firm* — Westerman, Hattori, Daniels & Adrian, LLP

(57) ABSTRACT

A video camera includes an image sensor. The image sensor repeatedly outputs an object scene image captured on an imaging surface. A CPU detects a luminance component of the object scene image outputted from the image sensor, i.e., an AE/AWB evaluation value, and also detects a high-frequency component of the object scene image outputted from the image sensor, i.e., an AF evaluation value. Moreover, the CPU executes a flicker determining process for determining whether or not a flicker is occurred based on the luminance component of the object scene image. However, prior to the flicker determining process, whether or not there is a dynamic object in the object scene is determined based on the high-frequency component of the object scene image. The flicker determining process is prohibited when there is the dynamic object while it is permitted when there is no dynamic object.

7 Claims, 13 Drawing Sheets

(A) FREQUENCY OF POWER SOURCE=60Hz (B) FREQUENCY OF POWER SOURCE=50Hz (A) FREQUENCY OF POWER SOURCE=60Hz (B) EXPOSURE TIME PERIOD=1/120sec : FLICKER AVOIDED (C) EXPOSURE TIME PERIOD=1/100sec : FLICKER OCCURRED (A) FREQUENCY OF POWER SOURCE=50Hz (B) EXPOSURE TIME PERIOD=1/120sec: FLICKER OCCURRED (C) EXPOSURE TIME PERIOD=1/100sec: FLICKER AVOIDED (A)

(B)

(C)

(A)

(B)

(C)

VIDEO CAMERA WITH FLICKER PREVENTION

CROSS REFERENCE OF RELATED APPLICATION

The disclosure of Japanese Patent Application No. 2008-183526, which was filed on Jul. 15, 2008 is incorporated herein by reference.

BACKGROUND OF THE INVENTION

1. Field of the Invention

The present invention relates to a video camera. More particularly, the present invention relates to a video camera which prevents occurring of a flicker resulting from a beat interference between an exposure time period of an imaging device and a blinking cycle of a fluorescent lamp.

2. Description of the Related Art

According to one example of this type of a camera, a level of a photographing signal outputted from an imaging portion is acquired for each field by a signal-level detecting device. A flicker detecting portion determines whether or not the acquired level has a variation resulting from a flicker, and when a determination result is affirmative, a shutter speed is changed. Thereby, it becomes possible to eliminate an adverse effect of the flicker on an autofocus operation. However, in the above-described camera, in a case where luminance is changed resulting from motion of an object existing in an object scene, pan/tilt on an imaging surface, a camera shake of an operator, etc., there is a possibility that occurrence of a flicker is erroneously determined although the flicker is not occurred.

SUMMARY OF THE INVENTION

A video camera according to the present invention, comprises: an imager for repeatedly outputting an object scene image captured on an imaging surface; a first detector for detecting a luminance component of the object scene image outputted from the imager; a second detector for detecting a high-frequency component of the object scene image outputted from the imager; a first determiner for determining whether or not a flicker is occurred based on the luminance component detected by the first detector; and a second determiner for determining whether or not a dynamic object exists in the object scene based on the high-frequency component detected by the second detector so as to start the first determiner.

Preferably, the first determiner executes a determining process by noticing the luminance component detected by the first detector in parallel with a detecting process of the second detector.

More preferably, further comprised are: a setter for setting an exposure time period of the imager to an integral multiple of a first predetermined value; and a changer for changing the exposure time period of the imager to a time period of an integral multiple of a second predetermined value when a determination result of the second determiner is updated from a negative result to an affirmative result.

Preferably, the second determiner starts the first determiner when the determination result indicates presence of the dynamic object.

Preferably, the second determiner includes a varying-width detector for detecting a varying width of an amount of the high-frequency component, and a varying-width determiner for determining whether or not the varying width detected by the varying-width detector exceeds a reference.

Preferably, the imaging surface has a first number of vertical pixels and the video camera further comprises an exposer for exposing the imaging surface by each second number of vertical pixels smaller than the first number.

An imaging control program product according to the present invention is an imaging control program product executed by a processor of a video camera including an imager for repeatedly outputting an object scene image captured on an imaging surface, an imaging control program product, comprises: a first detecting step of detecting a luminance component of the object scene image outputted from the imager; a second detecting step of detecting a high-frequency component of the object scene image outputted from the imager; a first determining step of determining whether or not a flicker is occurred based on the luminance component detected in the first detecting step; and a second determining step of determining whether or not a dynamic object exists in the object scene based on the high-frequency component detected in the second detecting step so as to start the first determining step.

An imaging controlling method according to present invention is an imaging controlling method executed by a video camera including an imager for repeatedly outputting an object scene image captured on an imaging surface, an imaging controlling method, comprises: a first detecting step of detecting a luminance component of the object scene image outputted from the imager; a second detecting step of detecting a high-frequency component of the object scene image outputted from the imager; a first determining step of determining whether or not a flicker is occurred based on the luminance component detected in the first detecting step; and a second determining step of determining whether or not a dynamic object exists in the object scene based on the high-frequency component detected in the second detecting step so as to start the first determining step.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
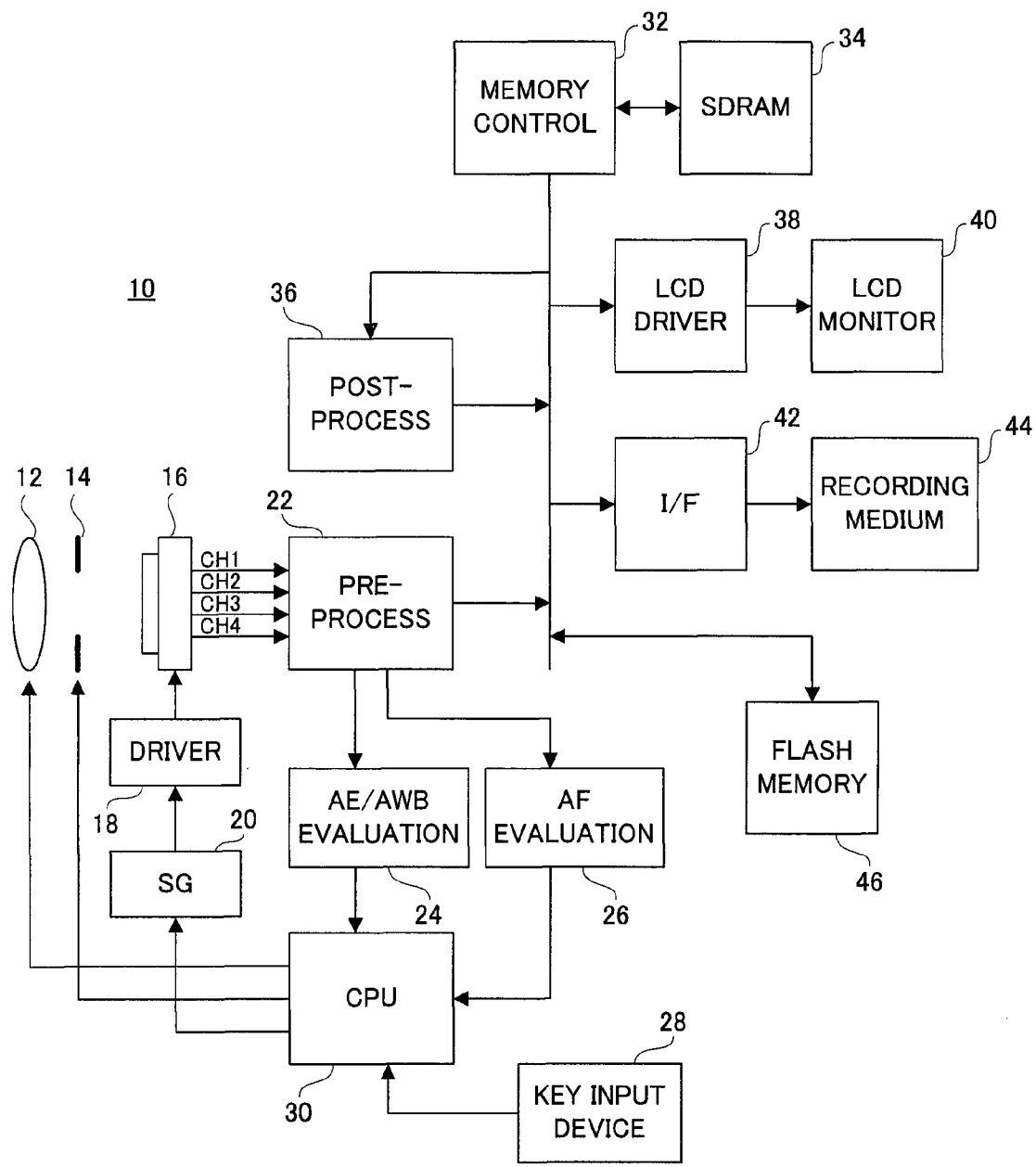
FIG. 1 is a block diagram showing a configuration of one embodiment of the present invention.

With reference to FIG. 1, a digital video camera 10 according to this embodiment includes a focus lens 12 and an aperture unit 14. An optical image of an object scene is irradiated onto an imaging surface of a CMOS-type image sensor 16 through these members. The imaging surface, for example, has an effective image area equivalent to horizontal 1440 pixels×vertical 1080 pixels, and is covered with a primary color filter (not shown) having a Bayer array. Therefore, in each pixel, electric charges having any one of color information, i.e., R (Red), G (Green), and B (Blue), are produced by photoelectric conversion.

When a power supply is inputted, a CPU 30 starts a driver 18 in order to execute a through-image process. In response to a vertical synchronization signal Vsync generated at every 1/60 seconds from an SG (Signal Generator) 20, the driver 18 exposes the imaging surface by each line according to a focal-plane electronic shutter system, and reads out the electric charges produced on the imaging surface in a progressive scanning manner. From the image sensor 16, raw image data representing the object scene is outputted at a frame rate of 60 fps.

Figure 2:
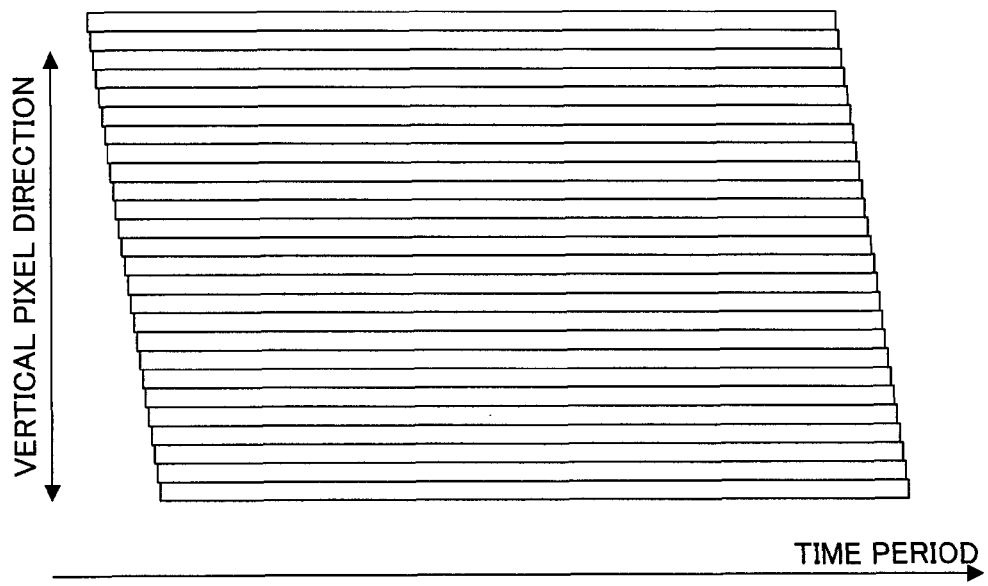
FIG. 2 is an illustrative view showing one example of a reading-out operation of electric charges produced on an imaging surface.

Because of an exposure operation according to the focal-plane electronic shutter system, an exposure timing differs depending on a position of a horizontal pixel column (=line), as shown in FIG. 2. Also, the raw image data is divided into four fields in a vertical direction, and four fields of the divided raw image data are outputted from channels CH1 to CH4, respectively.

Although described in detail later, one portion of the raw image data corresponding to pixel in a (4N+1)th column is equivalent to one field of the raw image data outputted from the channel CH1, and one portion of the raw image data corresponding to a pixel in a (4N+2)th column is equivalent to one field of the raw image data outputted from the channel CH2. Further, one portion of the raw image data corresponding to a pixel in a (4N+3)th column is equivalent to one field of the raw image data outputted from the channel CH3, and one portion of the raw image data corresponding to a pixel in a (4N+4)th column is equivalent to one field of the raw image data outputted from the channel CH4.

A pre-processing circuit 22 performs various processes such as a digital clamp, a pixel-defect correction, and gain control, on the raw image data thus outputted from the image sensor 16, and writes the processed raw image data into an SDRAM 34 through a memory control circuit 32.

A post-processing circuit 36 reads out the raw image data accommodated in the SDRAM 34 through the memory control circuit 32 at every 1/60 seconds, and performs various processes such as a color separation, a white balance adjustment, a YUV conversion, and a vertical zoom, on the read-out raw image data. As a result, image data corresponding to a YUV format is created at every 1/60 seconds. The created image data is written into the SDRAM 34 through the memory control circuit 32.

An LCD driver 38 repeatedly reads out the image data accommodated in the SDRAM 34, and drives an LCD monitor 40 based on the read-out image data. As a result, a real-time moving image (through image) representing an object scene is displayed on a monitor screen.

The pre-processing circuit 22 executes a simple RGB producing process and a simple Y producing process in addition to the above-described processes. The raw image data is converted into RGB data (data in which each pixel has all color information of R, G, and B) by the simple RGB converting process, and converted into Y data by the simple Y converting process. The RGB data produced by the simple RGB converting process is applied to an AE/AWB evaluating circuit 24, and the Y data produced by the simple Y converting process is applied to an AF evaluating circuit 26.

Figure 3:
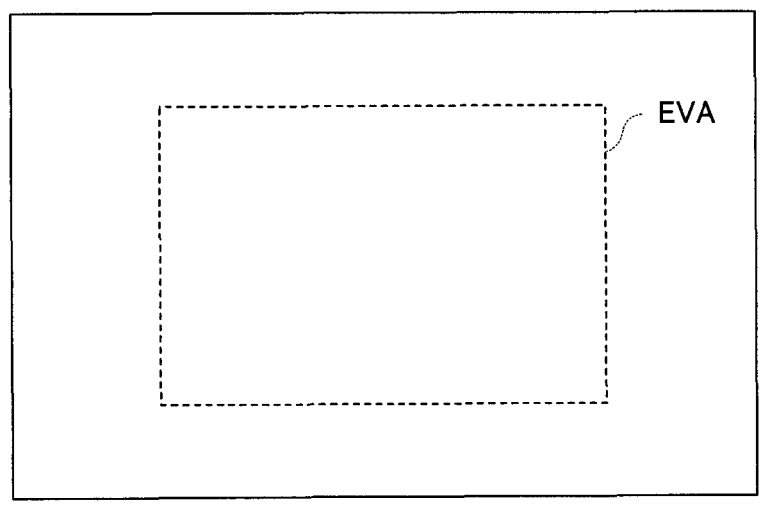
FIG. 3 is an illustrative view showing one example of an allocation state of an evaluation area on an imaging surface.

On the imaging surface, an evaluation area EVA is allocated, as shown in FIG. 3. The AE/AWB evaluating circuit 24 integrates the RGB data belonging to the evaluation area EVA, out of the RGB data applied from the pre-processing circuit 22, at every 1/60 seconds, and outputs an integral value, i.e., an AE/AWB evaluation value, toward the CPU 30. Moreover, the AF evaluating circuit 26 extracts a high-frequency component of the Y data belonging to the evaluation area EVA, out of the Y data applied from the pre-processing circuit 22, integrates the extracted high-frequency component at every 1/60 seconds, and outputs an integral value, i.e., an AF evaluation value, toward the CPU 30.

The CPU 30 repeatedly fetches the AE/AWB evaluation value from the AE/AWB evaluating circuit 24 under an AE/AWB task and based on the fetched AE/AWB evaluation value, calculates an appropriate EV value and a white balance adjustment-use appropriate gain. In addition, the CPU 30 sets an aperture amount and an exposure time period that define the calculated appropriate EV value to the aperture unit 14 and the driver 18, respectively, and sets the calculated white balance adjustment-use appropriate gain to the post-processing circuit 36. As a result, the brightness and the white balance of the moving image outputted from the LCD monitor 40 are adjusted moderately.

It is noted that the AE/AWB evaluation value may be defined as a "luminance component value" in association with the calculation of the appropriate EV value, and may be defined as an "RGB component value" in association with the calculation of the white balance adjustment-use appropriate gain.

The CPU 30 further repeatedly fetches the AF evaluation value from the AF evaluating circuit 26 under a continuous AF task and executes an AF process when the fetched AF evaluation value satisfies an AF starting condition. The AF starting condition is satisfied when a variation amount of the fetched AF evaluation value exceeds a threshold value, and by the AF process executed thereby, the focus lens 12 is placed at a focal point.

When a recording start manipulation is performed by a key input device 28, an I/F 42 is started by the CPU 30. The I/F 42 reads out the image data accommodated in the SDRAM 34 at every 1/60 seconds, and writes the read-out image data in a moving image file within a recording medium 44 in a compressed state. The I/F 42 is stopped by the CPU 30 when a recording end manipulation is performed on the key input device 28. As a result, a recording process of the image data is ended.

Figure 4:
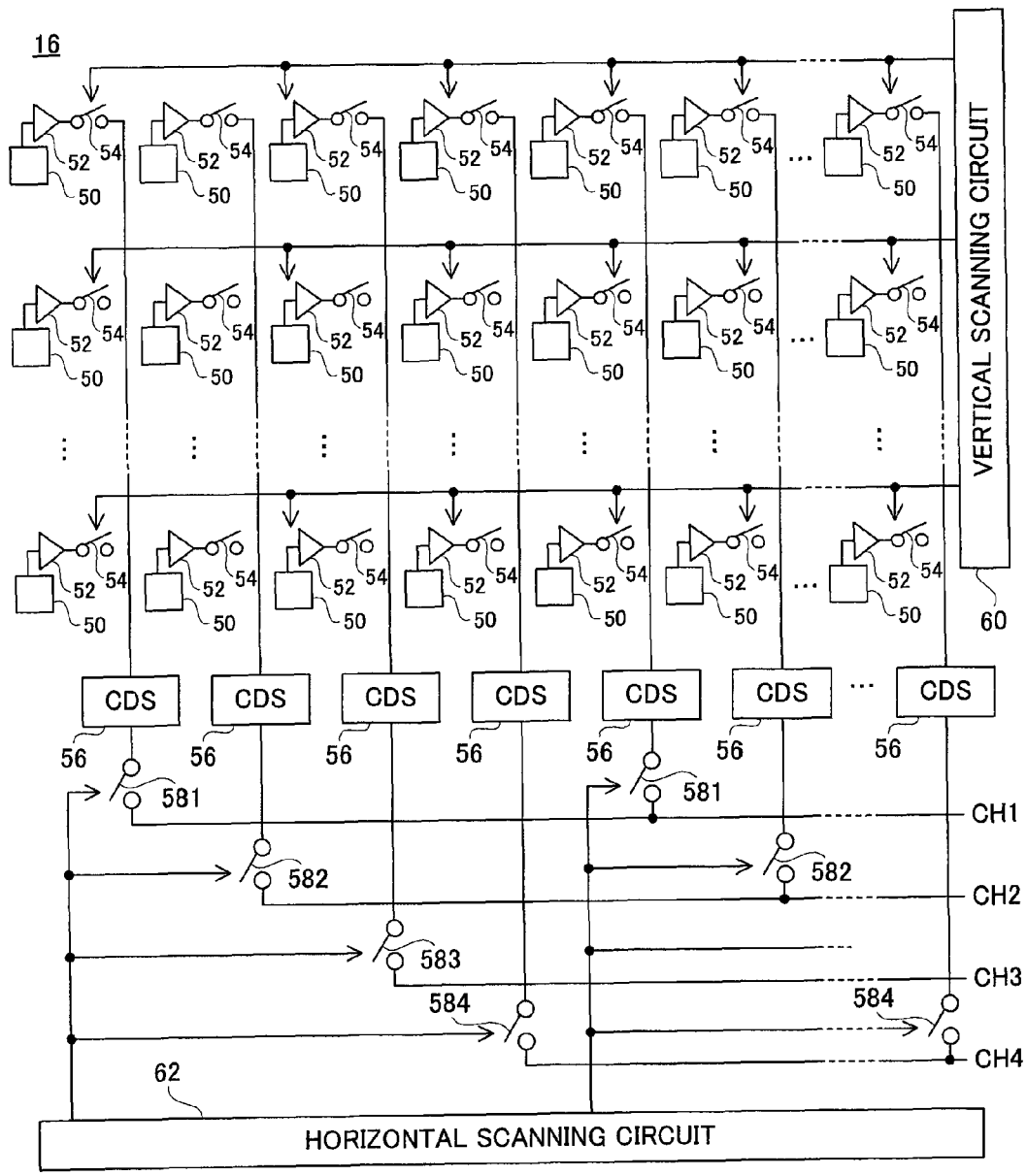
FIG. 4 is a block diagram showing one example of a configuration of an imaging device applied to the embodiment in FIG. 1.

The image sensor 16 is configured as shown in FIG. 4. The electric charges representing the object scene image are produced by a plurality of light-receiving elements 50, 50, . . . , placed in a matrix. Each light-receiving element 50 is equivalent to the above-described pixel. Each light-receiving element 50, 50, . . . , lined in a vertical direction is connected to a common CDS circuit 56 via an A/D converter 52 and a row selecting switch 54. The electric charge produced in each light-receiving element 50 is converted into 12-bit digital data by the A/D converter 52. A vertical scanning circuit 60 executes an operation for turning on/off each row selecting switch 54, 54, . . . , for each pixel, in a progressive scanning manner. Noise included in the pixel data that has undergone the row selecting switch 54 in an on state is removed by the CDS circuit 56.

A column selecting switch 581 is allocated to the CDS circuit 56 in a (4N+1)th column (N: 0, 1, 2, 3, . . . ), a column selecting switch 582 is allocated to the CDS circuit 56 in a (4N+2)th column, a column selecting switch 583 is allocated to the CDS circuit 56 in a (4N+3)th column, and a column selecting switch 584 is allocated to the CDS circuit 56 in a (4N+4)th column. A horizontal scanning circuit 64 turns on the column selecting switch 581 at a timing at which the row selecting switch 54 in the (4N+1)th column is turned on, turns on the column selecting switch 582 at a timing at which the row selecting switch 54 in the (4N+2)th column is turned on, turns on the column selecting switch 583 at a timing at which the row selecting switch 54 in the (4N+3)th column is turned on, and turns on the column selecting switch 584 at a timing at which the row selecting switch 54 in the (4N+4)th column is turned on.

As a result, partial raw image data based on the electric charge produced in the light-receiving element 50 in the (4N+1)th column is outputted from the channel CH1, and partial raw image data based on the electric charge produced in the light-receiving element 50 in the (4N+2)th column is outputted from the channel CH2. Also, partial raw image data based on the electric charge produced in the light-receiving element 50 in the (4N+3)th column is outputted from the channel CH3, and partial raw image data based on the electric charge produced in the light-receiving element 50 in the (4N+4)th column is outputted from the channel CH4.

Figure 5:
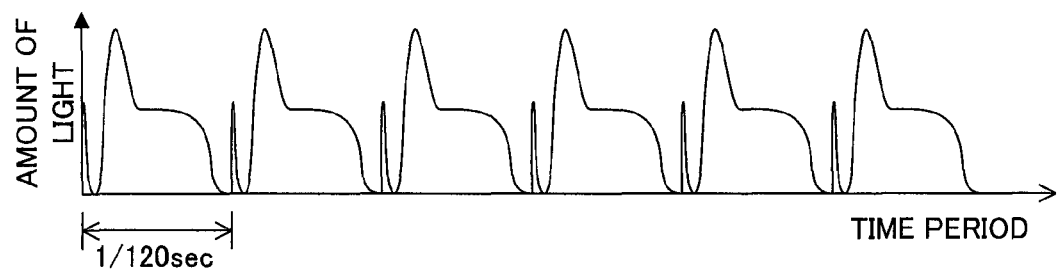
FIG. 5(A) is an illustrative view showing one example of a blinking state of a fluorescent lamp driven by a commercially available power source of 60 Hz.
FIG. 5(B) is an illustrative view showing one example of a blinking state of a fluorescent lamp driven by a commercially available power source of 50 Hz.
Figure 5:
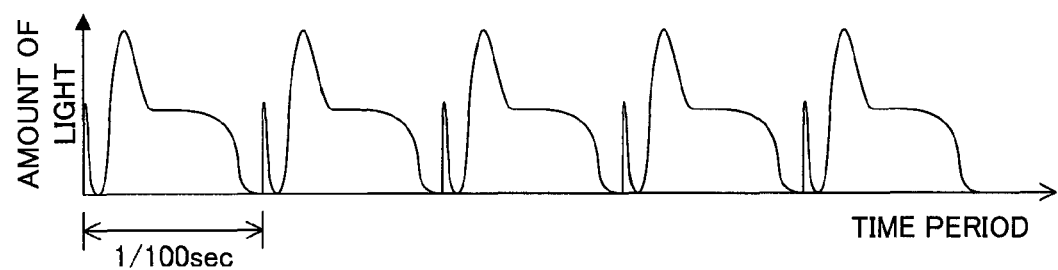

A fluorescent lamp driven by a commercially available power source of 60 Hz blinks as shown in FIG. 5(A), and a fluorescent lamp driven by a commercially available power source of 50 Hz blinks as shown in FIG. 5(B). On the other hand, because the image sensor 16 adopts a focal-plane electronic shutter system, the exposure timing differs depending on each horizontal pixel column.

Figure 6:
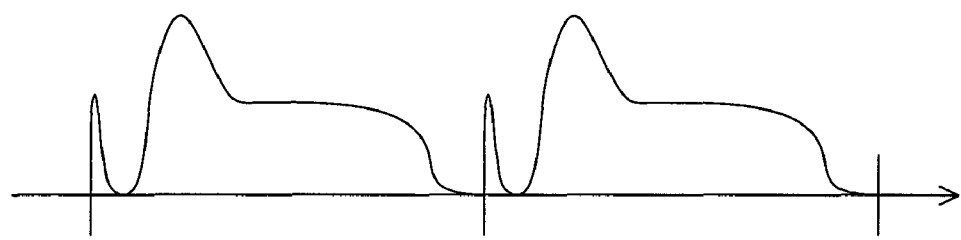
FIG. 6(A) is an illustrative view showing one example of a blinking state of a fluorescent lamp driven by a commercially available power source of 60 Hz.
FIG. 6(B) is an illustrative view showing one example of a reading-out operation of electric charges produced on an imaging surface.
FIG. 6(C) is an illustrative view showing another example of the reading-out operation of electric charges produced on the imaging surface.
Figure 6:
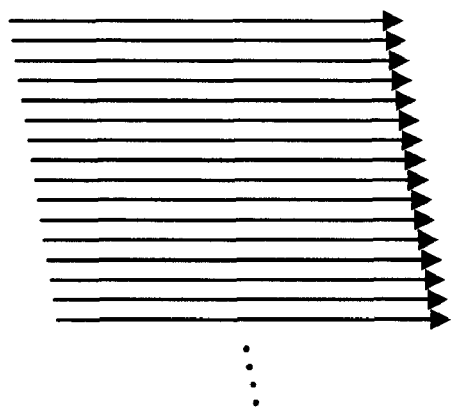
Figure 6:
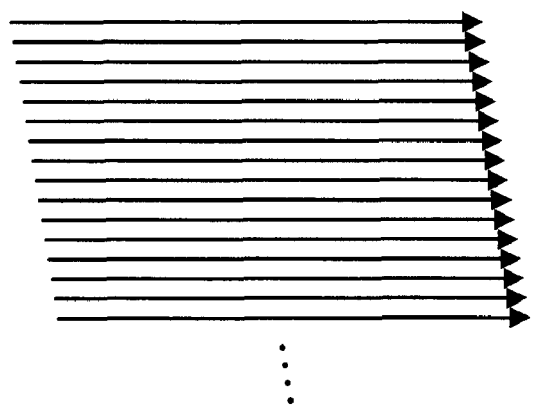

As a result, under a light source that blinks in a cycle equivalent to 60 Hz, flicker is occurred when the exposure time period is set to a value of an integral multiple of 1/100 seconds, and on the other hand, when the exposure time period is set to a value of an integral multiple of 1/120 seconds, occurrence of the flicker is avoided (see FIG. 6(A) to FIG. 6(C)).

Figure 7:
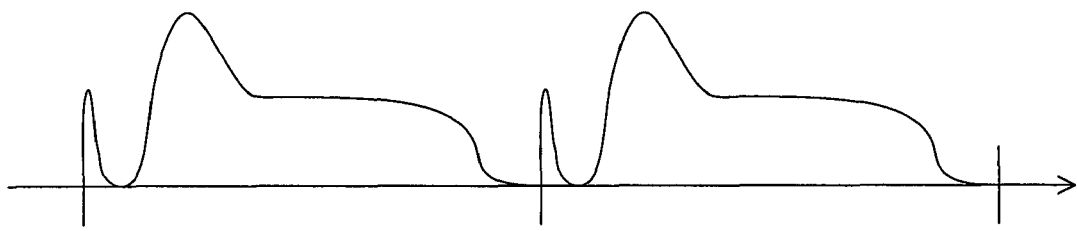
FIG. 7(A) is an illustrative view showing one example of a blinking state of a fluorescent lamp driven by a commercially available power source of 50 Hz.
FIG. 7(B) is an illustrative view showing one example of a reading-out operation of electric charges produced on an imaging surface.
FIG. 7(C) is an illustrative view showing another example of the reading-out operation of electric charges produced on the imaging surface.
Figure 7:
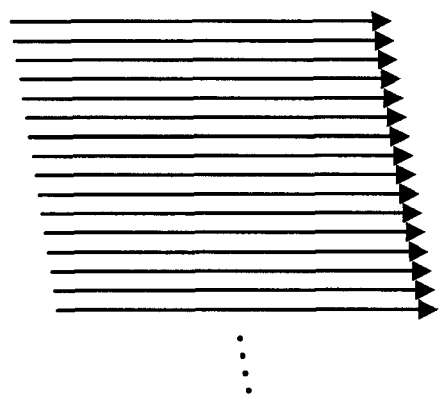
Figure 7:
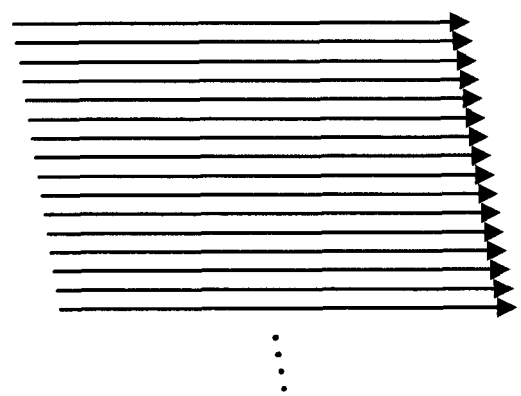

In contrary, under a light source that blinks in a cycle equivalent to 50 Hz, the flicker is occurred when the exposure time period is set to a value of an integral multiple of 1/120 seconds, and on the other hand, when the exposure time period is set to a value of an integral multiple of 1/100 seconds, occurrence of the flicker is avoided (see FIG. 7(A) to FIG. 7(C)).

Therefore, the CPU 30 sets a flag FLG to "0" under an assumption that firstly, the object scene is not influenced by the light source that blinks in a cycle equivalent to 50 Hz, under the above-described AE/AWB task When the above-described appropriate EV value is set, the CPU 30 further adjusts the exposure time period to a time period of an integral multiple of 1/120 seconds, and also adjusts the aperture amount to an amount that defines the appropriate EV value in cooperation with such an exposure time period.

The CPU 30 further determines whether or not the variation between frames of the AE/AWB evaluation value outputted from the AE/AWB evaluating circuit 24 is equivalent to the flicker, under a flicker countermeasure task that is executed in parallel with the AE/AWB task When the object scene exists under a light source that blinks in a cycle equivalent to 50 Hz, the AE/AWB evaluation value varies resulting from the flicker, and a result of the flicker determining process becomes affirmative. At this time, the CPU 30 changes the flag FLG to "1" in order to declare that the object scene is influenced by the light source that blinks in a cycle equivalent to 50 Hz.

Under the AE/AWB task after the flag FLG is changed to "1", the exposure time period is adjusted to a time period of an integral multiple of 1/100 seconds, and the aperture amount is adjusted to an amount that defines the appropriate EV value in cooperation with such an exposure time period. As a result of the exposure time period being adjusted to the time period of an integral multiple of 1/100 seconds, the flicker is dissolved.

It is noted that the flicker described with reference to FIG. 6(A) to FIG. 6(C) and FIG. 7(A) to FIG. 7(C) is a flicker occurred in a short cycle, i.e., within one frame, resulting from the fact that the image sensor 16 adopts a focal-plane electronic shutter system Needless to say, the flicker is occurred in a long cycle that extends over a plurality of frames.

Figure 8:
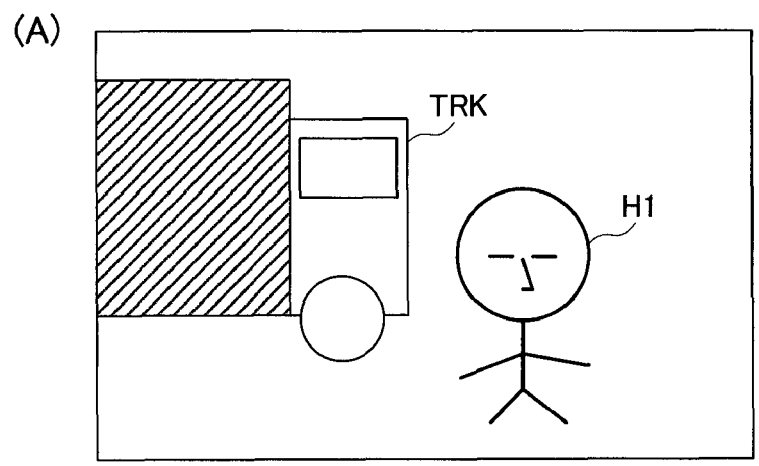
FIG. 8(A) is an illustrative view showing one example of an object scene.
FIG. 8(B) is an illustrative view showing another example of the object scene.
FIG. 8(C) is an illustrative view showing still another example of the object scene.
Figure 8:
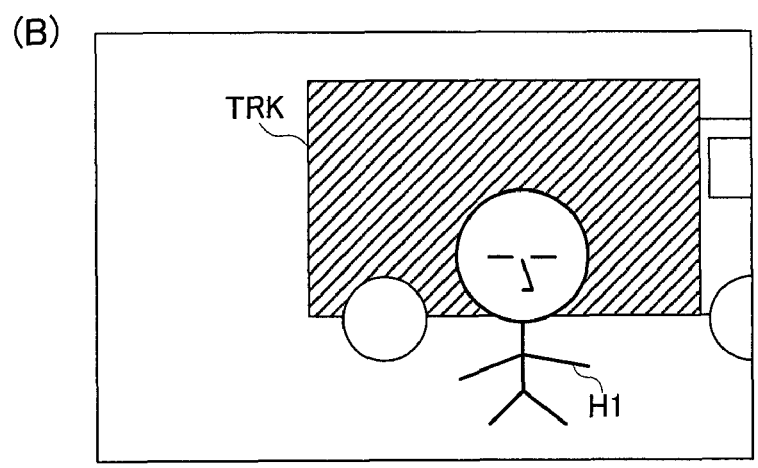
Figure 8:
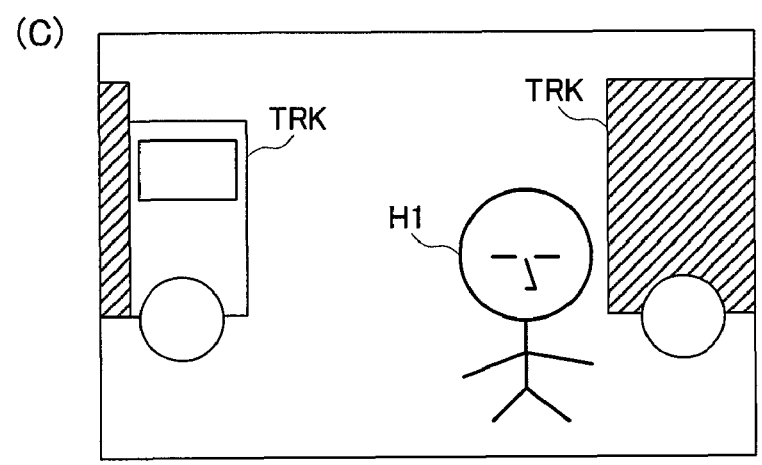
Figure 9:
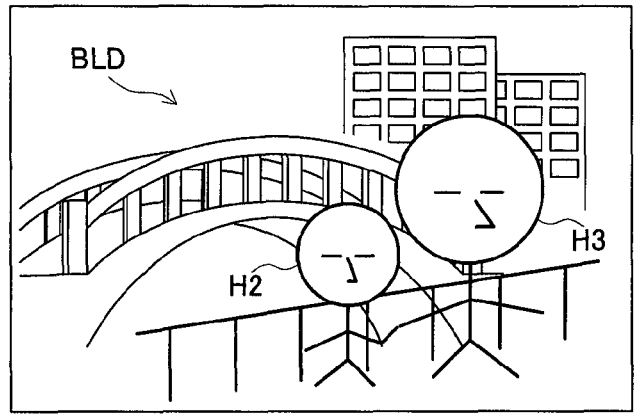
FIG. 9(A) is an illustrative view showing one example of the object scene.
FIG. 9(B) is an illustrative view showing another example of the object scene.
FIG. 9(C) is an illustrative view showing still another example of the object scene.
Figure 9:
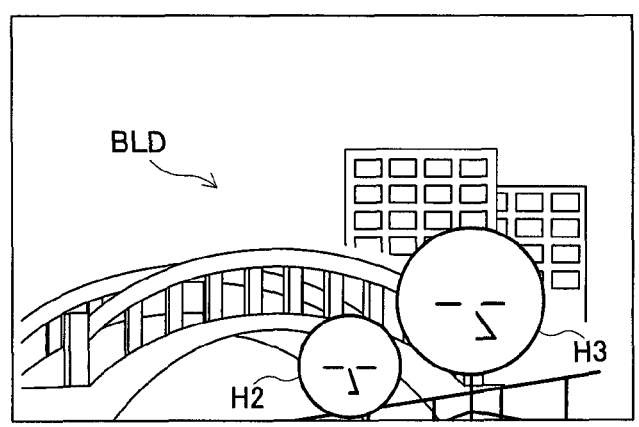
Figure 9:
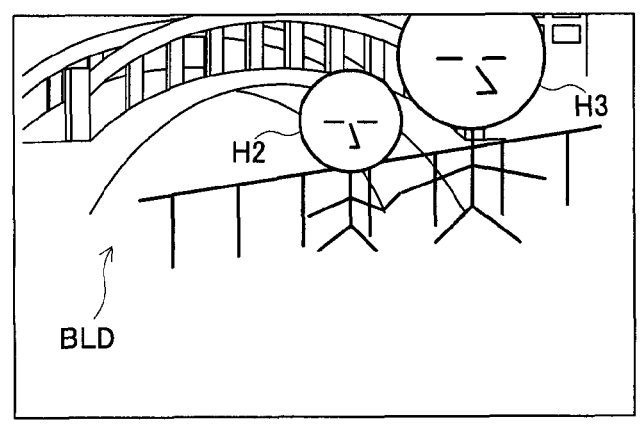

However, when the AE/AW evaluation value is varied due to motion of an object present in the object scene, pan/tilt of the imaging surface, camera shake of an operator, etc., the variation may be erroneously determined as the variation resulting from the flicker. For example, as shown in FIG. 8(A) and FIG. 8(B), when there is a truck TRK that moves at aback of a person H1, a variation of the AE/AWB evaluation value resulting from a movement of this truck TRK may be erroneously determined as the flicker. Also, when the imaging surface is vibrated up and down as shown in FIG. 9(A) and FIG. 9(B), a variation of the AE/AWB evaluation value resulting from a difference between a brightness of a building BLD present at backs of persons H2 and H3 and a brightness of sky may be erroneously determined as the flicker.

To prevent the erroneous determination, this embodiment is so configured that it is determined whether or not there is a dynamic object in the object scene under the flicker countermeasure task and when there is the dynamic object, the flicker determining process is prohibited while there is no dynamic object, the flicker determining process is permitted.

Whether or not there is the dynamic object is determined by noticing the AF evaluation value outputted from the AF evaluating circuit 26. Upon this determining process, a maximum AF evaluation value and a minimum AF evaluation value are detected from a plurality of continuous frames of AF evaluation values, the maximum AF evaluation value is compared with the threshold value TH1 and the varying width of the AF evaluation value i.e., a "maximum AF evaluation value/minimum AF evaluation value" is compared with the threshold value TH2.

Then, when the maximum AF evaluation value exceeds the threshold value TH1 and the "maximum AF evaluation value/minimum AF evaluation value" exceeds the threshold value TH2, the flicker determining process is prohibited, regarding that there is the dynamic object in the object scene. On the other hand, when the maximum AF evaluation value is equal to or less than the threshold value TH1 or the "maximum AF evaluation value/minimum AF evaluation value" is equal to or less than the threshold value TH2, the flicker determining process is permitted, regarding that there is no dynamic object in the object scene. Thereby, it becomes possible to avoid a situation where the variation of the AE/AWB evaluation value resulting from the motion of the object is erroneously determined as the flicker in the flicker determining process, and thus, the accuracy for determining the flicker is improved.

It is noted that the maximum AF evaluation value becomes equal to or less than the threshold value TH1 when a flat object scene such as a single-color wall is captured. Moreover, the "maximum AF evaluation value/minimum AF evaluation value" becomes equal to or less than the threshold value TH2 when a still object is captured.

Furthermore, in this embodiment, an object that exhibits a relative movement in view of an attitude of the imaging surface is defined as the "dynamic object". Therefore, in the example of FIG. 8(A) to FIG. 8(C), the truck TRK that moves at the back of the person H1 is equivalent to the dynamic object, and in the example of FIG. 9(A) to FIG. 9(C), the persons H2 to H3 or the building BLD stationary within the object scene is equivalent to the dynamic object.

Figure 10:
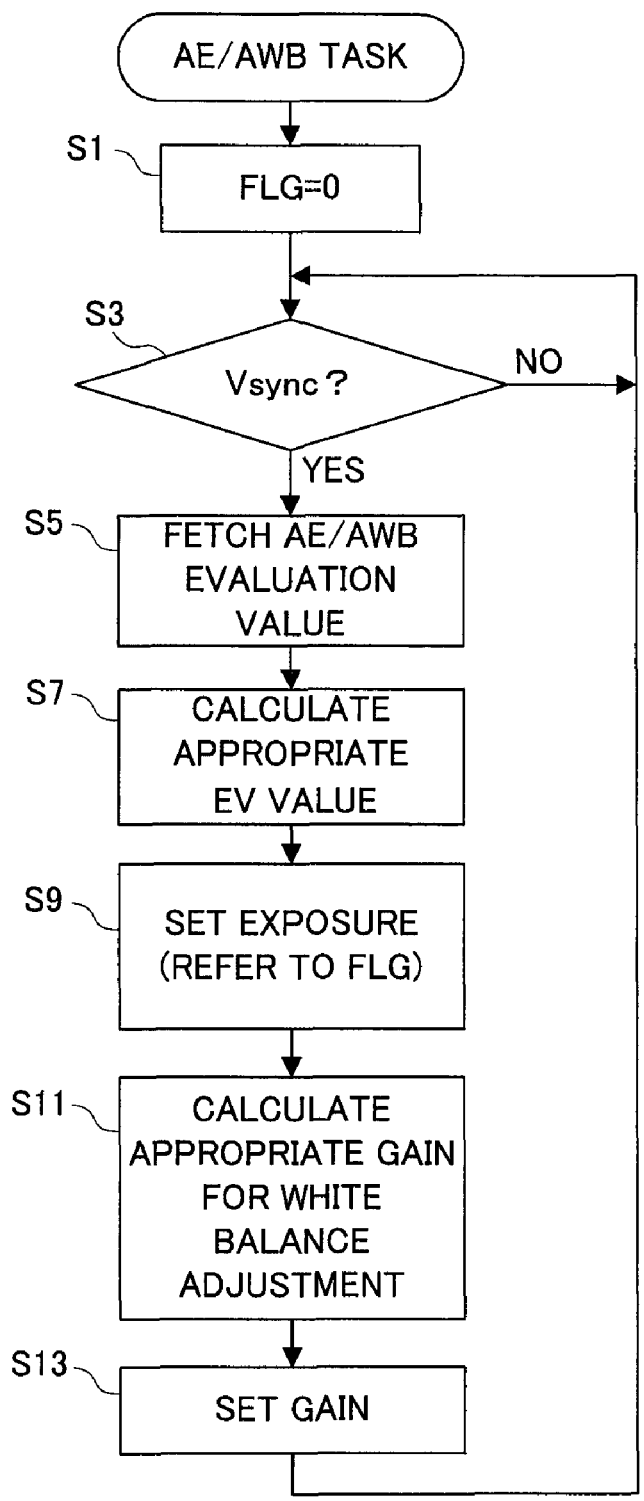
FIG. 10 is a flowchart showing one portion of an operation of a CPU applied to the embodiment in FIG. 1.
Figure 11:
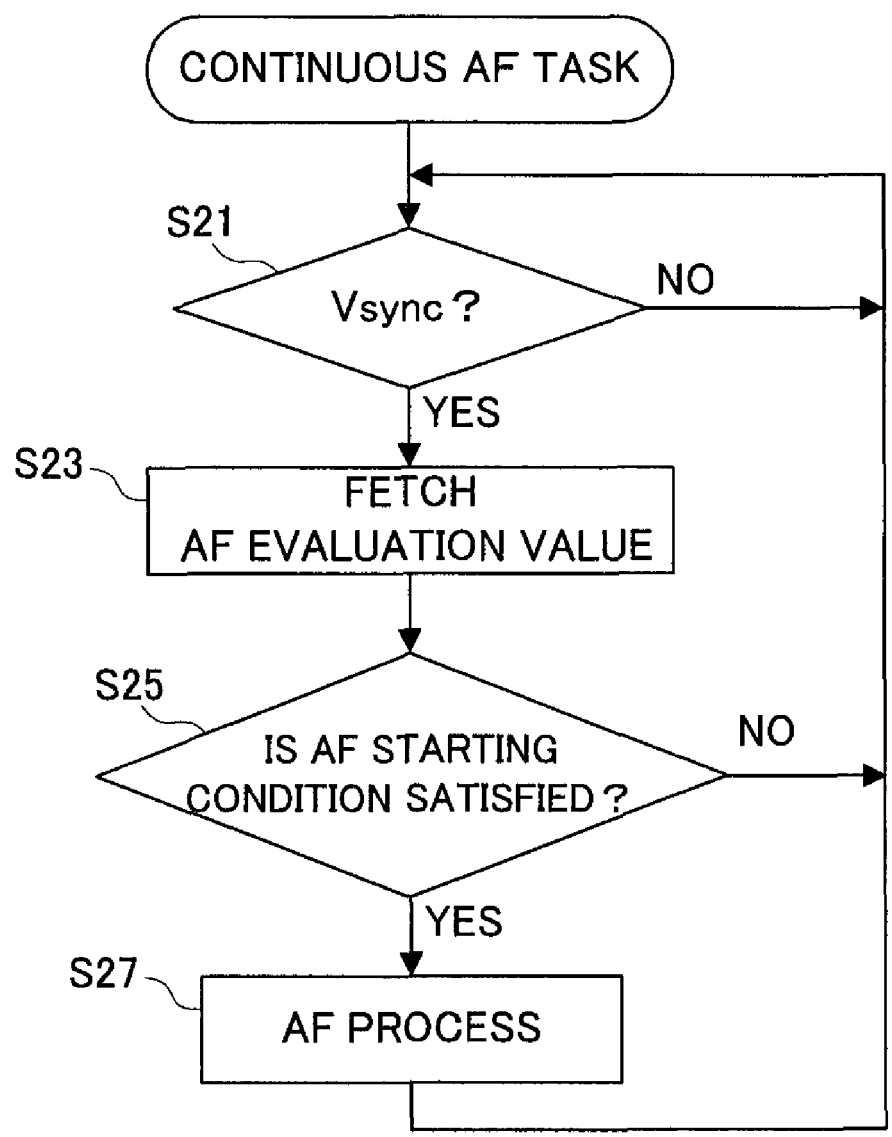
FIG. 11 is a flowchart showing another portion of the operation of the CPU applied to the embodiment in FIG. 1.
Figure 12:
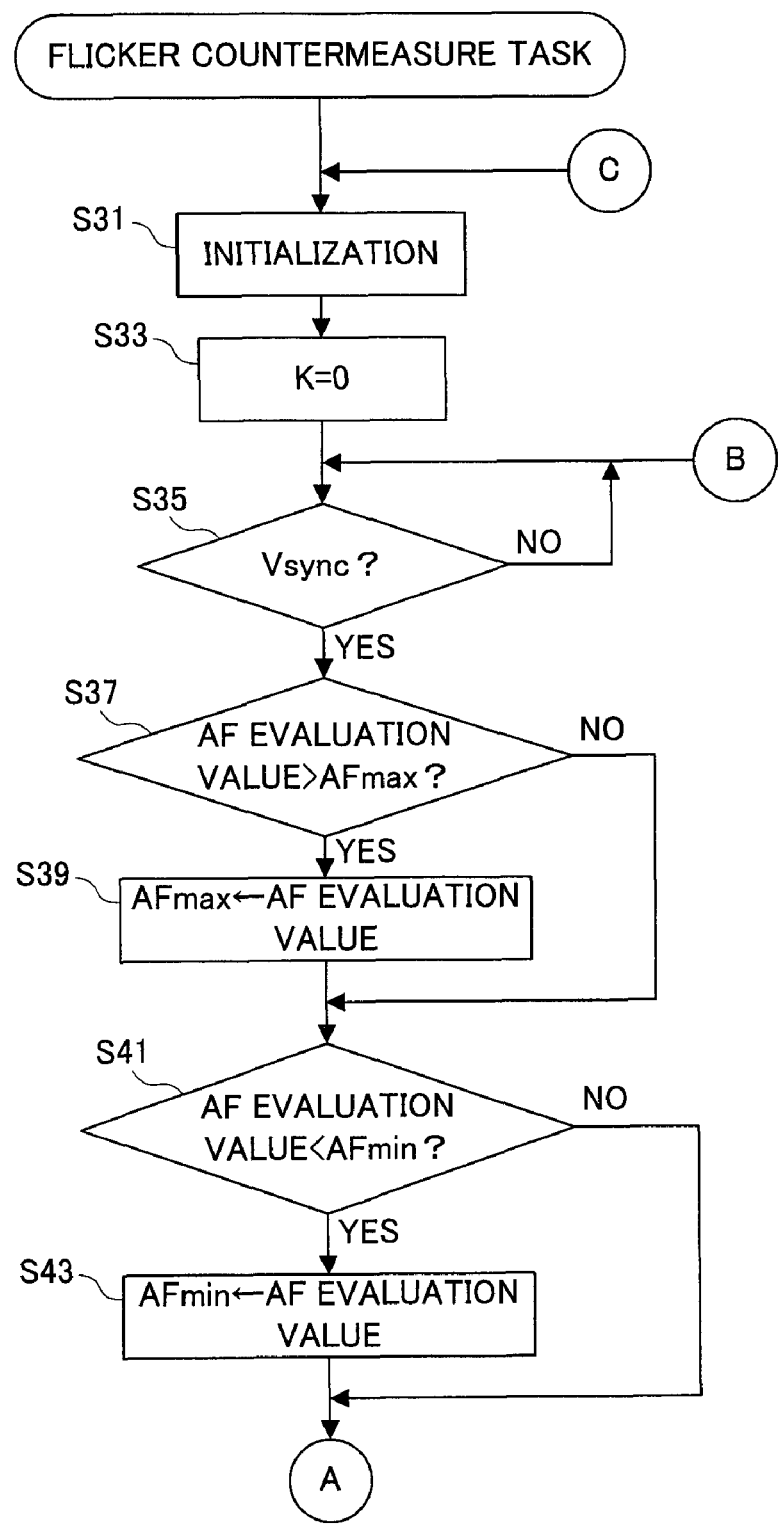
FIG. 12 is a flowchart showing still another portion of the operation of the CPU applied to the embodiment in FIG. 1.
Figure 13:
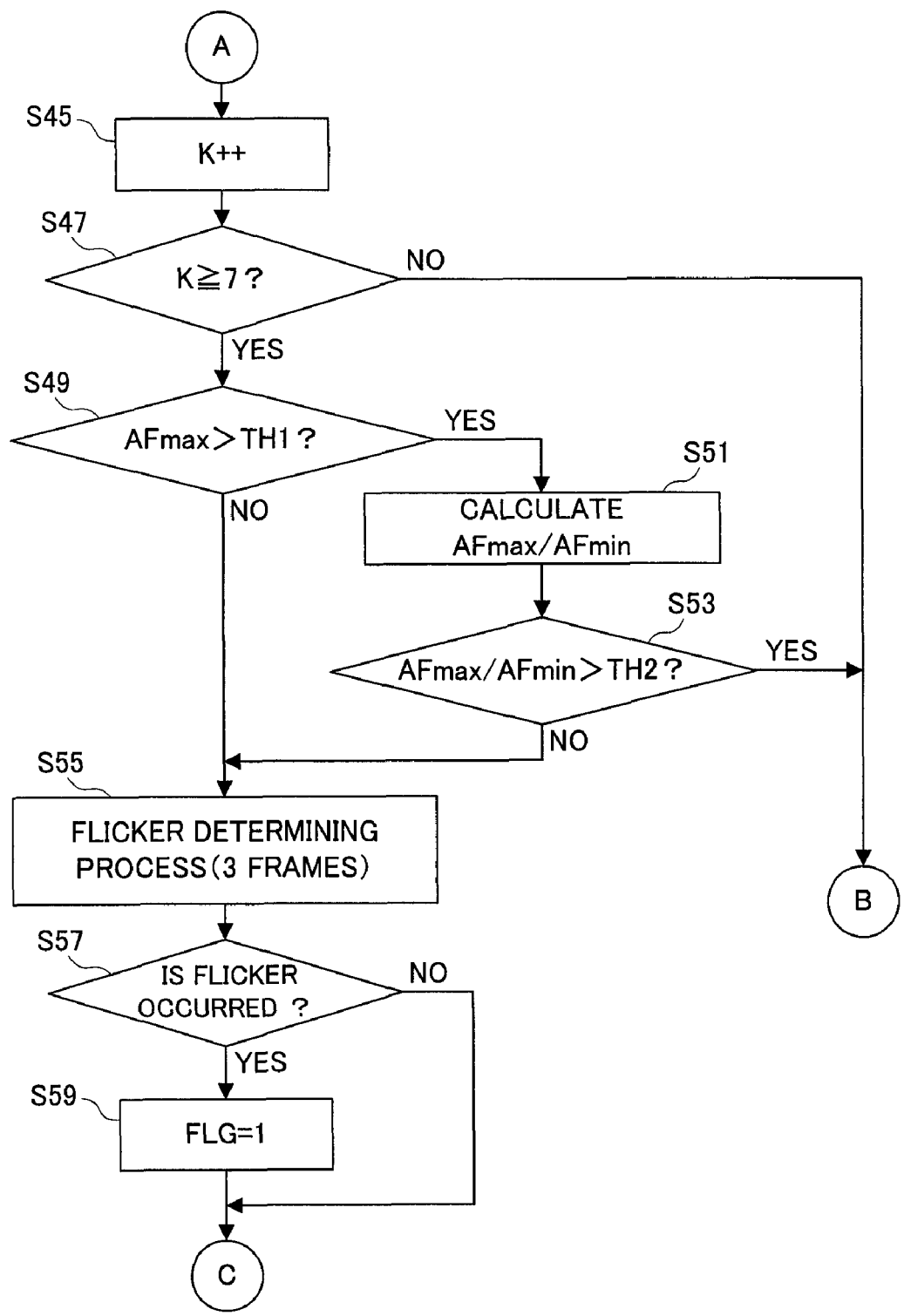
FIG. 13 is a flowchart showing yet still another portion of the operation of the CPU applied to the embodiment in FIG. 1.

The CPU 30 executes a plurality of tasks in parallel, including the AE/AWB task shown in FIG. 10, the continuous AF task shown in FIG. 11, and the flicker countermeasure task shown in FIG. 12 and FIG. 13. It is noted that control programs corresponding to these tasks are stored in the flash memory 46.

Firstly, with reference to FIG. 10, the flag FLG is set to "0" in a step S1. As described above, the flag FLG is a flag for identifying whether or not the object scene is influenced by the light source that blinks in a cycle equivalent to 50 Hz, and "0" indicates that the object scene is not under influence of such a light source while "1" indicates that the object scene is under influence of such a light source. As a result of the process in the step S1, it is provisionally declared that the object scene is not influenced by the light source that blinks in a cycle equivalent to 50 Hz.

When the vertical synchronization signal Vsync is generated, YES is determined in a step S3, and the AE/AWB evaluation value is fetched from the AE/AWB evaluating circuit 24 in a step S5. In a step S7, based on the fetched AE/AWB evaluation value, the appropriate EV value is calculated.

In a step S9, the aperture amount and the exposure time period that define the appropriate EV value calculated in the step S7 are determined, and the determined aperture amount and exposure time period are set to the aperture unit 14 and the driver 18, respectively. In order to adjust the aperture amount and the exposure time period, the flag FLG is referenced.

That is, when the flag FLG indicates "0", it is determined that the object scene is not under influence of the light source of 50 Hz, and an exposure time period indicating a value of an integral multiple of 1/120 seconds and an aperture amount that defines the appropriate EV value in cooperation with this exposure time period are calculated. On the other hand, when the flag FLG indicates "1", it is determined that the object scene is under influence of the light source of 50 Hz, and an exposure time period indicating a value of an integral multiple of 1/100 seconds and an aperture amount that defines the appropriate EV value in cooperation with this exposure time period are calculated.

In a step S11, based on the AE/AWB evaluation value fetched in the step S5, the white balance adjustment-use appropriate gain is calculated. In a step S13, the calculated appropriate gain is set to the post-processing circuit 3 6, and upon completion of the setting process, the process returns to the step S3.

With reference to FIG. 11, it is determined whether or not the vertical synchronization signal Vsync is generated in a step S21, and if YES is determined, the AF evaluation value is fetched from the AF evaluating circuit 26 in a step S23. In a step S25, whether or not the AF starting condition is satisfied is determined based on the fetched AF evaluation value, and if NO is determined, the process directly returns to the step S21 while if YES is determined, the AF process is executed in a step S27, and then, the process returns to the step S21. As a result of the process in the step S27, the focus lens 12 is placed at the focal point With reference to FIG. 12 and FIG. 13, variables AFmax and AFmin are initialized in a step S31, and the variable K is set to "0" in a step S33. The variable AFmax is a variable for holding the maximum AF evaluation value, and the variable AFmin is a variable for holding the minimum AF evaluation value. Moreover, the variable K is a variable for measuring the number of times of the vertical synchronization signal Vsync to be generated. As a result of the initializing process in the step S31, the latest AF evaluation value is set to each of the variables AFmax and AFmin.

In a step S35, it is determined whether or not the vertical synchronization signal Vsync is generated, and if YES is determined, a process in which the latest AF evaluation value is noticed is executed in steps S37 to S43. In the step S37, it is determined whether or not the latest AF evaluation value exceeds the variable AFmax, and in the step S41, it is determined whether or not the latest AF evaluation value falls below the variable AFmin. When YES is determined in the step S37, the process proceeds to the step S39 in which the latest AF evaluation value is set to the variable AFmax. When YES is determined in the step S41, the process proceeds to the step S43 in which the latest AF evaluation value is set to the variable AFmin.

In a step S45, the variable K is incremented, and in a step S47, it is determined whether or not the variable K is equal to or more than "7". When the variable K is less than "7", the process returns to the step S35 while when the variable K is equal to or more than "7", the process then proceeds to a process in a step S49 and thereafter.

In the step S49, it is determined whether or not the variable AFmax exceeds the threshold value TH1. Moreover, in a step S51, a ratio of the variable AFmax to the variable AFmin, i.e., "AFmax/AFmin", is calculated, and in a step S53, it is determined whether or not the calculated "AFmax/AFmin" exceeds the threshold value TH2. When YES is determined in both the steps S49 and S53, the process returns to the step S35, regarding that there is the dynamic object in the object scene. On the other hand, when NO is determined in either one of the step S49 or S51, the process proceeds to the step S55, regarding that there is no dynamic object in the object scene.

In the step S55, the flicker determining process is executed. More specifically, a variation of latest three frames of the AE/AWB evaluation values fetched in the AE/AEB task executed in parallel is noticed, and it is determined whether or not this variation is equivalent to the flicker. When the noticed variation is not equivalent to the flicker, NO is determined in a step S57, and the process directly returns to the step S31. On the other hand, when the noticed variation is equivalent to the flicker, YES is determined in the step S57, and the process returns to the step S3 1 after setting the flag FLG to "1" in a step S59. As a result of the process in the step S59 being executed, the exposure time period indicating a value of an integral multiple of ¹⁄₁₀₀ seconds and the aperture amount that defines the appropriate EV value in cooperation with this exposure time period are calculated in the step S9 shown in FIG. 10. As a result, the flicker is dissolved.

As understood from the above description, the image sensor 16 repeatedly outputs the object scene image captured on the imaging surface. The CPU 30 detects a luminance component (=AE/AWB evaluation value) of the object scene image outputted from the image sensor 16 (S5), and also, detects a high-frequency component (=AF evaluation value) of the object scene image outputted from the image sensor 16 (S23). Moreover, the CPU 30 executes the flicker determining process for determining whether or not the flicker is occurred based on the luminance component of the object scene image (S55). It is noted that prior to the flicker determining process, whether or not there is the dynamic object in the object scene is determined based on the high-frequency component of the object scene image, and the flicker determining process is started in light of the determination result regarding the dynamic object (S49 to S53).

Therefore, it is possible to perform such control that the flicker determining process is prohibited in a circumstance where there is the dynamic object in the object scene while it is permitted in a circumstance where there is no dynamic object in the object scene. Thereby, it becomes possible to avoid a situation where the variation of the luminance component resulting from the movement of the object is erroneously determined as the flicker in the flicker determining process, and therefore, the accuracy for determining the flicker is improved.

Figure 14:
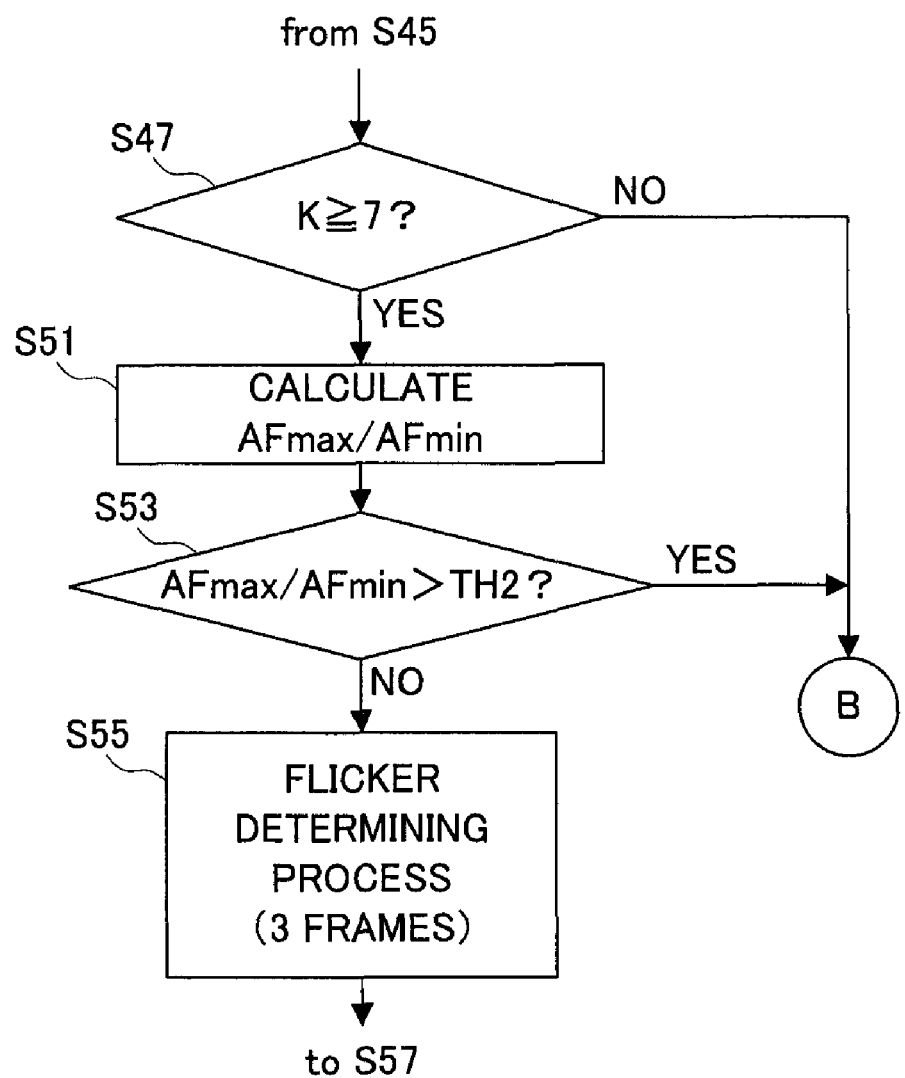
FIG. 14 is a flowchart showing one portion of an operation of a CPU applied to another embodiment.

It is noted that in this embodiment, when determining whether or not there is the dynamic object in the object scene, the variable AFmax is compared with the threshold value TH1 and "Afmax/AFmin" is compared with the threshold value TH2 (see steps S49 to S53 in FIG. 13). However, the process for comparing the variable AFmax with the threshold value TH1 may be omitted. In this case, the flowchart shown in FIG. 13 is modified as shown in FIG. 14.

Furthermore, in this embodiment, the AE/AWB evaluation value is created based on the simple RGB data. However, the AE evaluation value may be created based on the simple Y data while the AWB evaluation value may be created based on the simple RGB data.

Moreover, in this embodiment, a CMOS-type image sensor is adopted. However, instead thereof, a CCD-type image sensor may be adopted.

Also, in this embodiment, the focus lens 12 is moved in an optical-axis direction in order to adjust the focus. However, instead of the focus lens 12 or together with the focus lens 12, the imaging surface may be moved in the optical-axis direction.

Moreover, in this embodiment, a video camera for recording a moving image is assumed. However, the present invention may also be applied to a still camera for recording a still image. The problem of the flicker within one frame, which is described with reference to FIG. 6(A) to FIG. 6(C) and FIG. 7(A) to FIG. 7(C), becomes conspicuous when the still image is recorded. According to the present invention, it is possible to precisely dissolve such a flicker occurring within one frame, and thus, the present invention is also suitable for the still camera for recording a still image.

Furthermore, in this embodiment, in the step S31 in FIG. 12, the latest AF evaluation value is set to each of the variables AFmx and AFmin, respectively. However, instead thereof, predetermined reference values REF 1 and REF2 may be set to the variables AFmx and AFmin, respectively.

Moreover, in this embodiment, the electric charges produced on the imaging surface are read out in a progressive scanning manner. However, instead thereof, the electric charges may be read out in another raster scanning manner such as an interlace scanning manner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:
   an imager which outputs, in a designated cycle, an electronic image representing a scene captured on an imaging surface;
   an integrator which integrates, in the designated cycle, a high-frequency component of the electronic image outputted from said imager;
   a first detector which detects a luminance component of the electronic image outputted from said imager;
   a second detector which detects a maximum integral value and a minimum integral value from among a plurality of integral values calculated by said integrator during a time period equivalent to N (N: integer more than one) multiples of the designated cycle;
   a first determiner which determines whether or not a flicker is occurred based on the luminance component detected by said first detector; and
   a second determiner which determines whether or not a predetermined condition is satisfied with respect to the maximum integral value and the minimum integral value detected by said second detector so as to start said first determiner, wherein the predetermined condition is equivalent to a condition under which the maximum integral value exceeds a first threshold value and a divided value obtained by dividing the maximum integral value by the minimum integral value exceeds a second threshold value.

2. A video camera according to claim 1, wherein said first determiner executes a determining process by noticing the luminance component detected by said first detector in parallel with a process of said integrator.

3. A video camera according to claim 1, further comprising:
   a setter which sets an exposure time period of said imager to an integral multiple of a first predetermined value; and a changer which changes the exposure time period of said imager to a time period of an integral multiple of a second predetermined value when a determination result of said second determiner is updated from a negative result to an affirmative result.

4. A video camera according to claim 1, wherein said second determiner stops said first determiner when the determination result indicates satisfaction of the predetermined condition.

5. A video camera according to claim 1, wherein said imaging surface has a first number of vertical pixels and said video camera further comprises an exposure processor which exposes said imaging surface by each vertical pixels of second number which is smaller than the first number.

6. A computer program recorded on a non-transitory recording medium in order to control a video camera provided with an imager which outputs, in a designated cycle, an electronic image representing a scene captured on an imaging surface, and an integrator which integrates, in the designated cycle, a high-frequency component of the electronic image outputted from said imager, causing a processor of the video camera to execute the steps comprising:
  a first detecting step of detecting a luminance component of the electronic image outputted from said imager;
  a second detecting step of detecting a maximum integral value and a minimum integral value from among a plurality of integral values calculated by said integrator during a time period equivalent to N (N: integer more than one) multiples of the designated cycle;
  a first determining step of determining whether or not a flicker is occurred based on the luminance component detected by said first detecting step; and
  a second determining step of determining whether or not a predetermined condition is satisfied with respect to the maximum integral value and the minimum integral value detected by said second detecting step so as to start said first determining step, wherein the predetermined condition is equivalent to a condition under which the maximum integral value exceeds a first threshold value and a divided value obtained by dividing the maximum integral value by the minimum integral value exceeds a second threshold value.

7. An imaging control method executed by a video camera provided with an imager which outputs, in a designated cycle, an electronic image representing a scene captured on an imaging surface, and an integrator which integrates, in the designated cycle, a high-frequency component of the electronic image outputted from said imager, comprising:
  a first detecting step of detecting a luminance component of the electronic image outputted from said imager;
  a second detecting step of detecting a maximum integral value and a minimum integral value from among a plurality of integral values calculated by said integrator during a time period equivalent to N (N: integer more than one) multiples of the designated cycle;
  a first determining step of determining whether or not a flicker is occurred based on the luminance component detected by said first detecting step; and
  a second determining step of determining whether or not a predetermined condition is satisfied with respect to the maximum integral value and the minimum integral value detected by said second detecting step so as to start said first determining step, wherein the predetermined condition is equivalent to a condition under which the maximum integral value exceeds a first threshold value and a divided value obtained by dividing the maximum integral value by the minimum integral value exceeds a second threshold value.

* * * * *